(12) United States Patent
Han (10) Patent No.: US 10,347,881 B2
(45) Date of Patent: Jul. 9, 2019

(54) BATTERY MODULE INCLUDING SPACER AND INSULATION SHEET

(71) Applicant: SAMSUNG SDI CO., LTD., Yongin-si, Gyeonggi-do (KR)

(72) Inventor: Min-Yeol Han, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 185 days.

(21) Appl. No.: 15/131,639

(22) Filed: Apr. 18, 2016

(65) Prior Publication Data

US 2016/0308186 A1 Oct. 20, 2016

(30) Foreign Application Priority Data

Apr. 17, 2015 (KR) .................. 10-2015-0054490

(51) Int. Cl.
*H01M 2/18* (2006.01)
*H01M 2/10* (2006.01)
*H01M 10/0525* (2010.01)
*H01M 10/6566* (2014.01)

(52) U.S. Cl.
CPC ...... *H01M 2/1016* (2013.01); *H01M 10/0525* (2013.01); *H01M 10/6566* (2015.04)

(58) Field of Classification Search
CPC ........ H01M 2/02; H01M 2/1094; H01M 2/18; H01M 10/0525; H01M 2/1077
See application file for complete search history.

(56) References Cited

U.S. PATENT DOCUMENTS

| | | | | |
|---|---|---|---|---|
| 1,500,221 A | * | 7/1924 | Benner | ............. H01M 10/0525 429/163 |
| 1,937,045 A | * | 11/1933 | Schulte | ................... H01M 6/44 429/159 |
| 2010/0136386 A1 | * | 6/2010 | Holung | ............... H01M 2/1094 429/56 |
| 2010/0306995 A1 | * | 12/2010 | Scheuerman | ....... H01M 2/1077 29/623.1 |
| 2012/0129023 A1 | * | 5/2012 | Nakahama | .............. H01M 2/02 429/83 |
| 2014/0287291 A1 | * | 9/2014 | Miyawaki | ........... H01M 2/1077 429/120 |
| 2015/0303425 A1 | * | 10/2015 | Kong | .................. H01M 2/1077 429/152 |

FOREIGN PATENT DOCUMENTS

| | | |
|---|---|---|
| JP | 2000-048867 A | 2/2000 |
| JP | 2012-204129 A | 10/2012 |
| KR | 10-2014-0064418 A | 5/2014 |

* cited by examiner

*Primary Examiner* — Kenneth J Douyette
(74) *Attorney, Agent, or Firm* — Lee & Morse, P.C.

(57) ABSTRACT

A battery module includes battery cells arranged adjacent to each other along a first direction, a spacer between neighboring battery cells, and a multi-layer insulation sheet between the neighboring battery cells together with the spacer, the multi-layer insulation sheet including a plurality of insulation layers extending in parallel with surfaces of the battery cells.

11 Claims, 8 Drawing Sheets

BATTERY MODULE INCLUDING SPACER AND INSULATION SHEET

CROSS-REFERENCE TO RELATED APPLICATION

Korean Patent Application No. 10-2015-0054490, filed on Apr. 17, 2015, in the Korean Intellectual Property Office, and entitled: "Battery Module," is incorporated by reference herein in its entirety.

BACKGROUND

1. Field

One or more exemplary embodiments relate to a battery module.

2. Description of the Related Art

Unlike primary batteries, secondary batteries are rechargeable. Secondary batteries are used as energy sources of devices, e.g., mobile devices, electric vehicles, hybrid electric vehicles, electric bicycles, and uninterruptible power supplies. Single-cell secondary batteries or multi-cell secondary batteries (secondary battery modules) including a plurality of battery cells electrically connected to one another are used according to the types of devices that employ secondary batteries.

SUMMARY

One or more exemplary embodiments include a battery module having a sufficient degree of stiffness against an internal or external pressure, thereby effectively absorbing an external pressure or an internal pressure caused by swelling.

One or more exemplary embodiments include a battery module having improved anti-penetration characteristics against a conductor pushed from the outside into the battery module.

According to one or more exemplary embodiments, a battery module includes battery cells arranged adjacent to each other along a first direction, a spacer between neighboring battery cells, and a multi-layer insulation sheet between the neighboring battery cells together with the spacer, the multi-layer insulation sheet including a plurality of insulation layers extending in parallel with surfaces of the battery cells.

The spacer and the multi-layer insulation sheet may be disposed at non-overlapping positions such that the spacer and the multi-layer insulation sheet do not physically interfere with each other.

The multi-layer insulation sheet may be in an opening of the spacer.

The opening may be formed in a center region of the spacer.

The opening may be opened in the forward or backward direction and closed by the spacer in upward, downward, left, and right directions.

The multi-layer insulation sheet and the spacer may be formed of different materials.

The multi-layer insulation sheet may be formed of an insulating, elastic material.

The multi-layer insulation sheet may be formed of a silicone material or a polymer resin.

The multi-layer insulation sheet may further include a connection pattern between the insulation layers and connecting the insulation layers, and the multi-layer insulation sheet may have a netlike cross-section.

The connection pattern may extend in directions crossing the insulation layers so as to connect the insulation layers to one another.

The connection pattern may extend between neighboring pairs of the insulation sheets in directions crossing the insulation sheets so as to connect the pairs of the insulation sheets to one another.

The connection pattern may be a stripe pattern extending and crossing the insulation layers in a direction perpendicular to the insulation layers.

The connection pattern may have a waveform in which a plurality of convex or concave shapes are repeatedly arranged.

The connection pattern may have a triangular waveform.

The insulation layers and the connection pattern may be formed in one piece by using the same material.

Voids may be formed between the insulation layers.

The spacer may have a waveform in which a plurality of convex or concave shapes are repeatedly arranged.

The spacer may undergo an elastic deformation while tending to spread in a left, right, upward, or downward direction in response to a compressive force applied thereto in the forward or backward direction so as to absorb the compressive force applied in the forward or backward direction.

The multi-layer insulation sheet may be within an opening of the spacer.

The plurality of insulation layers of the multi-layer insulation sheet may be stacked within the opening of the spacer, the first direction extending along a normal to major surfaces of the plurality of insulation layers.

The multi-layer insulation sheet may further include a connection pattern in the first direction that interconnects the insulation layers to define a three-dimensional mesh structure.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

A battery module will now be described in detail with reference to the accompanying drawings, in which exemplary embodiments are shown.

Figure 1:
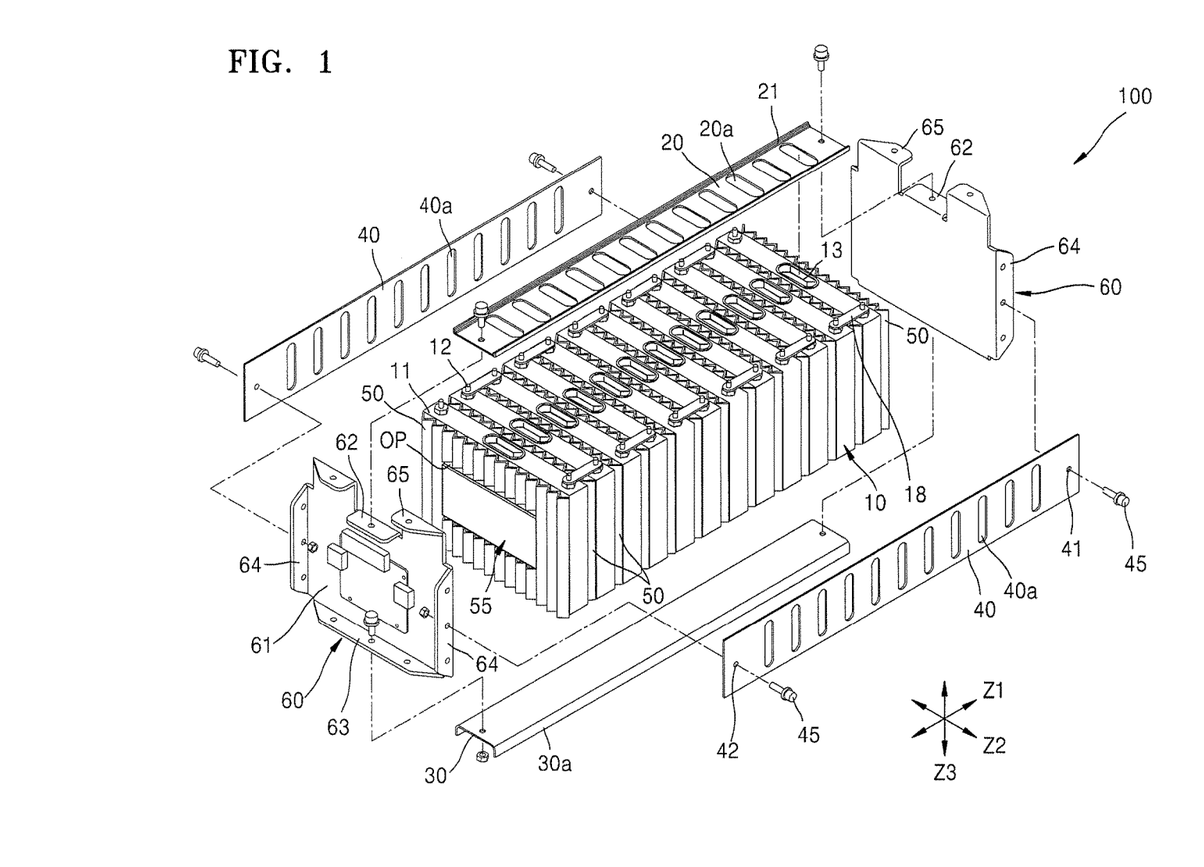
FIG. 1 illustrates an exploded perspective view of a battery module according to an exemplary embodiment.
Figure 2:
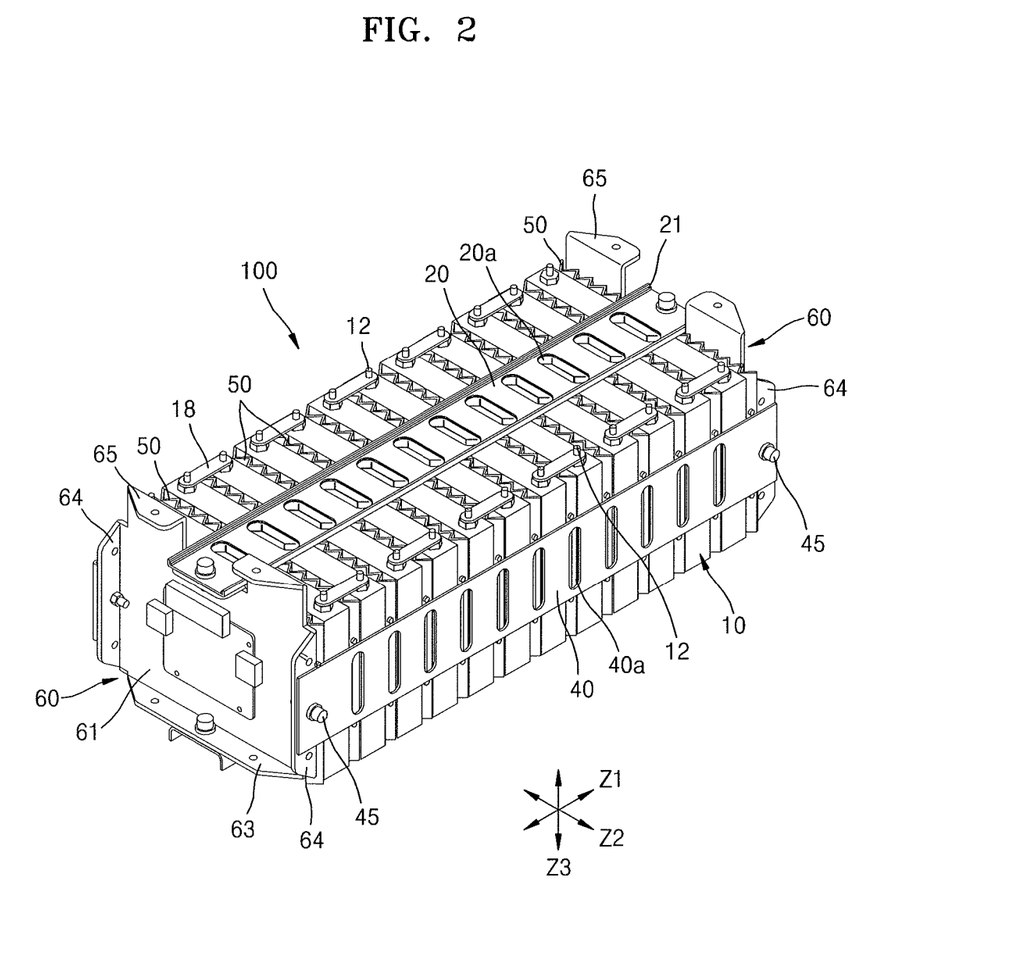
FIG. 2 illustrates a perspective assembled view of the battery module in FIG. 1.
Figure 3:
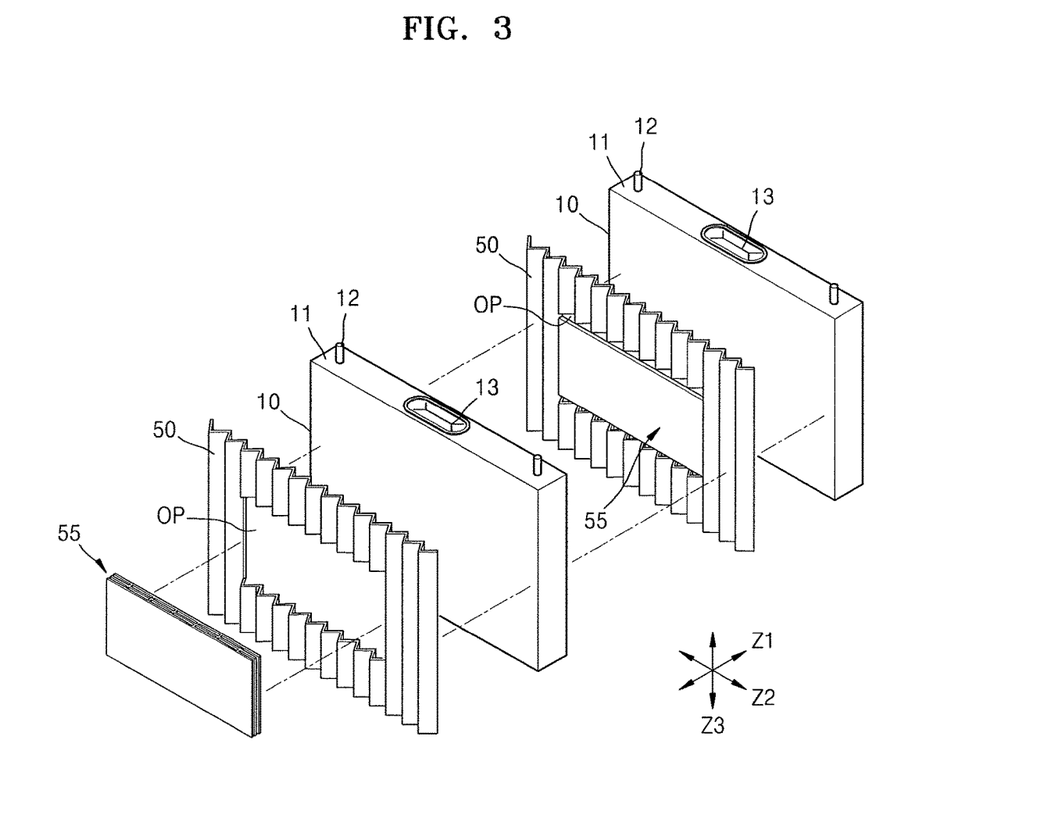
FIG. 3 illustrates an exploded perspective view of elements of the battery module illustrated in FIG. 1.

FIG. 1 is an exploded perspective view of a battery module 100 according to an exemplary embodiment. FIG. 2 is an assembled view of the battery module 100. FIG. 3 is an exploded perspective view of some elements of the battery module 100.

Referring to FIGS. 1 to 3, the battery module 100 may include a plurality of battery cells 10 arranged in a forward or backward direction Z1, and upper, lower, side, and end plates 20, 30, 40, and 60 surrounding the battery cells 10. For example, the battery cells 10 may be arranged in an array shape in the forward or backward direction Z1. The battery module 100 may include a single array of the battery cells 10 or stacked multiple arrays of the battery cells 10.

The battery cells 10 may be secondary battery cells, e.g., lithium-ion battery cells. The battery cells 10 may have any shape, e.g., a cylindrical shape or a prismatic shape. In addition, the battery cells 10 may be any type of battery cells, e.g., polymer battery cells. That is, the battery cells 10 are not limited to a particular shape or type.

For example, each of the battery cells 10 may include a case 11, an electrode assembly disposed in the case 11, and electrode terminals 12 electrically connected to the electrode assembly and exposed to the outside of the case 11. For example, the electrode terminals 12 may be exposed to the outside of the case 11 and may form a portion of an upper side of the case 11. Although not shown, the electrode assembly may include a positive electrode plate, a separator, and a negative electrode plate. The electrode assembly may be a jelly-roll or stacked type electrode assembly. The case 11 accommodates the electrode assembly, and the electrode terminals 12 are exposed to the outside of the case 11 for electric connection with an external circuit (not shown).

For example, the battery cells 10 neighboring each other may be electrically connected to each other by connecting the electrode terminals 12 of the battery cells 10. In detail, the battery cells 10 may be electrically connected in series or parallel to each other by connecting the electrode terminals 12 of the battery cells 10 to one another using bus bars 18.

A safety vent 13 may be formed in the case 11. The safety vent 13 has a relatively weak resistance so that, if an inner pressure in the case 11 increases to a critical value or higher, the safety vent 13 may break so that a gas is released from the inside of the case 11.

The end plates 60 are provided as a pair on both ends of the battery cells 10 in an arrangement direction (the forward or backward direction Z1) of the battery cells 10. Sides of the end plates 60 face outermost battery cells 10. The end plates 60 combine the battery cells 10 as a unit. During charging and discharging of the battery cells 10, the end plates 60 prevent expansion of the battery cells 10 and maintain resistance characteristics of the battery cells 10, thereby preventing deterioration of the electric characteristics of the battery cells 10.

Each of the end plates 60 includes a base plate 61 and flanges 62, 63, 64, and 65 bent from edges of the base plate 61. The base plate 61 may have a sufficient area to cover a corresponding outer side of the battery cells 10.

The flanges 62, 63, 64, and 65 are bent from the edges of the base plate 61 in a direction opposite, e.g., away from, the battery cells 10. In this case, the flanges 62, 63, 64, and 65 may be formed by bending and/or cutting edge portions of the base plate 61. For example, the flanges 63 and 64 may be formed by bending lower, left, and right edge portions of the base plate 61 without cutting the base plate 61, and the flanges 62 and 65 may be formed by cutting an upper edge portion of the base plate 61 and separately bending cut portions of the upper edge portion at different heights. The flanges 62, 63, 64, and 65 may function as coupling structures between the end plate 60 and another member, and thus may be variously modified according to the coupling structure between the end plate 60 and another member. In addition, the flanges 62, 63, 64, and 65 enhance the mechanical stiffness of the end plate 60. A plurality of coupling holes may be formed in the flanges 62, 63, 64, and 65.

The end plates 60 are coupled to each other through the side plates 40. That is, the side plates 40 combine, e.g., attach to, the end plates 60 provided as a pair. The side plates 40 extend along lateral sides of the battery cells 10. First ends of the side plates 40 are coupled to one of the end plates 60, and the second ends of the side plates 40 are coupled to the other of the end plates 60. The side plates 40 may be band-shaped strips extending in one direction. Coupling holes 41 and 42 are formed in both end portions of the side plates 40, and the flanges 64 of the end plates 60 bent from the left and right edges of the end plates 60 may be coupled to the side plates 40 by inserting screws in the coupling holes 41 and 42. For example, after overlapping the side plates 40 and the flanges 64, coupling members 45 may be coupled to the coupling holes 41 and 42. For example, bolts may be inserted in the coupling holes 41 and 42, and nuts may be coupled to the bolts for coupling the side plates 40 and the flanges 64.

Heat-dissipating holes 40a may be formed in the side plates 40. For example, the heat-dissipating holes 40a may be formed at regular intervals in the length direction of the side plates 40. Air may flow to the battery cells 10 through the heat-dissipating holes 40a, and thus heat may be rapidly dissipated from the battery cells 10 during operations of the battery cells 10.

The lower plate 30 is disposed on a lower side of the battery cells 10. The lower plate 30 extends across the lower side of the battery cells 10 and is connected to lower portions of the end plates 60. The lower plate 30 may be a strip including bent portions 30a formed by bending both sides of the strip to face each other. The lower plate 30 may support the weight of the battery module 100 including the battery cells 10, and owing to the bent portions 30a of the lower plate 30, the bending strength of the lower plate 30 may be improved.

The lower plate 30 may be coupled to the flanges 63 bent from lower edges of the end plates 60. That is the flanges 63 may be placed on the lower plate 30, followed by aligning coupling holes of the flanges 63 and the lower plate 30, and fastening the flanges 63 and the lower plate 30 using fasteners, e.g., bolts and nuts.

The upper plate 20 is disposed on an upper side of the battery cells 10. The upper plate 20 extends across the upper side of the battery cells 10 and is connected to upper portions of the end plates 60. The upper plate 20 may be a strip including bent portions 21 formed by bending both sides of the strip to face each other. Openings 20a may be arranged in the length direction of the upper plate 20 at positions corresponding to the positions of the safety vents 13 of the battery cells 10. The upper plate 20 may be coupled to the flanges 62 bent from upper edges of the end plates 60 by placing the flanges 62 on the upper plate 20, aligning coupling holes of the flanges 62 and the upper plate 20, and fastening the flanges 62 and the upper plate 20 using fasteners, e.g., bolts and nuts.

Spacers 50 are disposed between battery cells 10 neighboring each other, e.g., each spacer 50 may be positioned between two adjacent battery cells 10. The spacers 50 may be disposed between the battery cells 10 for absorbing pressure between neighboring battery cells 10. For example, the spacers 50 may absorb pressure between neighboring battery cells 10 when an impact is applied to the battery cells 10 or when the battery cells 10 swell during charging and discharging operations.

For example, the spacers 50 may undergo an elastic deformation to spread in a direction different from the forward or backward direction Z1, e.g., spread along a left or right direction Z2 perpendicular to the forward or backward direction Z1, in response to a compressive force applied in the arrangement direction (i.e., the forward or backward direction Z1) of the battery cells 10. Thus, the spacers 50 absorb the compressive force applied in the forward or backward direction Z1.

In more detail, if the battery module 100 is pressed in the forward or backward direction Z1 by an external pressure applied to the battery module 100, the spacers 50 may absorb most of the compressive strain on the battery module 100, i.e., most of the pressure applied to the battery module 100 or most of a deformation of the battery module 100. For example, in a compression test for evaluating the safety of the battery module 100 against deformation, the spacers 50 may absorb most of the pressure applied to the battery module 100 while absorbing most of the deformation of the battery module 100.

For example, the spacers 50 may undergo an elastic deformation while spreading in a direction different from the forward or backward direction Z1, e.g., in the left or right direction Z2 perpendicular to the forward or backward direction Z1, in response to a longitudinal compressive force or deformation in the arrangement direction (the forward or backward direction Z1) of the battery cells 10. As such, the spacers 50 may effectively absorb the longitudinal compressive force or deformation in the forward or backward direction Z1 of the battery module 100. The elastic deformation of the spacers 50 will be described later in more detail.

In the exemplary embodiment, the spacers 50 absorb longitudinal compressive force acting in the forward or backward direction Z1 of the battery module 100 while undergoing elastic deformation to spread in the left or right direction Z2 different form the forward or backward direction Z1. However, the spacers 50 are not limited thereto. For example, in another exemplary embodiment, the spacers 50 may be configured to absorb longitudinal compressive force acting in the forward or backward direction Z1 of the battery module 100 while undergoing deformation tending to spread in an upward or downward direction Z3 different from the forward or backward direction Z1.

During charging and discharging operations of the battery cells 10, the spacers 50 may absorb swelling of the battery cells 10, i.e., pressure or expansion of the battery cells 10 neighboring each other. Therefore, the spacers 50 may reduce the pressure of the battery cells 10. This will now be described in more detail.

When the battery cells 10 swell and expand during charging and discharging operations, the spacers 50 disposed between the battery cells 10 may function as buffers absorbing the swelling and expansion of the battery cells 10. For example, when the battery cells 10 expand and change in shape, the spacers 50 may be flexibly and elastically deformed between the battery cells 10. Thus, the battery cells 10 may not be excessively pressed. That is, the spacers 50 may absorb expansion of the battery cells 10 and maintain pressure between the battery cells 10 at a substantially constant level. If pressure between the battery cells 10 is excessively high above a proper level, the possibility of safety accidents, e.g., explosions, may increase.

For example, as illustrated in FIG. 3, the spacers 50 may have a waveform pattern in which a plurality of convex shapes (or concave shapes) are repeatedly arranged so that the spacers 50 may be flexibly and elastically deformed while spreading or contracting in the left or right direction Z2 according to expansion or contraction of the battery cells 10. In this case, the left or right direction Z2 in which the spacers 50 spread or contract may be perpendicular to the arrangement direction (i.e., the forward or backward direction Z1) of the battery cells 10.

For example, the expression "the spacers 50 undergo elastic deformation while spreading or contracting" refers to the state in which the spacers 50 are elastically deformed while the distance between the convex shapes of the spacers 50 is increased or decreased. For example, the spacers 50 may absorb expansion of the battery cells 10 in the forward or backward direction Z1 while being elastically deformed, and when the battery cells 10 contract to their original shapes, the spacers 50 may also return to their original shapes owing to the resilience of the spacers 50.

In the exemplary embodiment, the spacers 50 may have a triangular waveform pattern in which triangular wedge shapes are repeatedly arranged in the left or right direction Z2. However, the exemplary embodiments of the present disclosure are not limited thereto. For example, the spacers 50 may have a rounded water waveform.

The spacers 50 may be formed of an elastic material so as to be elastically deformed according to pressure applied thereto or according to expansion of the battery cells 10. For example, the spacers 50 may be formed of a metallic material having a proper elastic modulus in consideration of swelling of the battery cells 10 or the amount of elastic force to be applied to the battery cells 10. For example, the spacers 50 may be formed of an aluminum material which is light and has a proper elastic modulus. As described later, the spacers 50 may function as heat-dissipating structures. Thus, the spacers 50 may be formed of a metallic material having a high degree of thermal conductivity so as to provide improved heat-dissipating structures. However, in the exemplary embodiment, materials that may be used to form the spacers 50 are not limited thereto.

The spacers 50 may provide heat-dissipating passages between the battery cells 10. In detail, the spacers 50 may have a waveform pattern in which a plurality of convex shapes (or concave shapes) are repeatedly arranged, and thus a plurality of empty spaces may be formed between the battery cells 10. The spaces may function as clearances allowing elastic deformation of the spacers 50 and may function as cooling channels through which a cooling medium, e.g., ambient air, having a relatively low temperature flows between the battery cells 10.

During charging and discharging operations of the battery cells 10, heat accumulated in the battery cells 10 causes swelling of the battery cells 10. Therefore, if the spacers 50 including a plurality of convex shapes provide cooling medium channels between the battery cells 10, the battery cells 10 may be easily cooled, and thus swelling of the battery cells 10 may be prevented.

Multi-layer insulation sheets 55 are disposed between the battery cells 10 together with the spacers 50, e.g., each multi-layer insulation sheet 55 may be positioned within a corresponding spacer 50. As described later, the multi-layer insulation sheets 55 may have a function different from the function of the spacers 50. For example, the multi-layer insulation sheets 55 may be used to protect the battery cells 10 against penetration, and the spacers 50 may be used to improve the stability of the battery cells 10 against compression. To this end, the multi-layer insulation sheets 55 and the spacers 50 may be formed of different materials and may have different structures. In addition, the multi-layer insulation sheets 55 and the spacers 50 may be disposed at non-overlapping positions for preventing physical interference therebetween. That is, the multi-layer insulation sheets 55 may be disposed in openings OP of the spacers 50 so as to prevent physical interference between the multi-layer insulation sheets 55 and the spacers 50, as will be described in detail below. For example, the multi-layer insulation sheet 55 may be interference fit within the opening OP, or the multi-layer insulation sheet 55 may be fixed between the adjacent battery cells 10 with pressure.

Referring to FIG. 3, the openings OP are formed in the spacers 50. The openings OP may be defined as being surrounded by the spacers 50. The openings OP may be defined through main surfaces of the spacers 50, e.g., each opening OP may extend through an entire thickness of a corresponding spacer 50 along the direction Z1. The openings OP are opened in a direction (the forward or backward direction Z1) normal to the main surfaces of the spacers 50, e.g., the openings OP may have a thickness in a plane defined by the Z2 and Z3 directions to face the Z1 direction, but closed in upward, downward, left, and right directions. For example, as illustrated in FIG. 3, the spacer 50 may extend along an entire perimeter of the opening OP, e.g., to define a frame entirely surrounding the opening OP. For example, the openings OP may be formed in center regions of the spacers 50 and may be closed in the upward, downward, left, and right directions.

For example, the size of the spacers 50 may be similar to the size of the battery cells 10. The multi-layer insulation sheets 55 may be disposed in center regions of the spacers 50 corresponding to center regions of the battery cells 10. The multi-layer insulation sheets 55 are provided to improve anti-penetration characteristics of the battery cells 10, e.g., against conductors pushed from outside into the battery cells 10. To this end, the multi-layer insulation sheets 55 may be disposed in the center regions of the spacers 50 by taking into consideration conductors pushed into the center regions of the battery cells 10. For example, each multi-layer insulation sheet 55 may be positioned within a corresponding opening OP.

Figure 4:
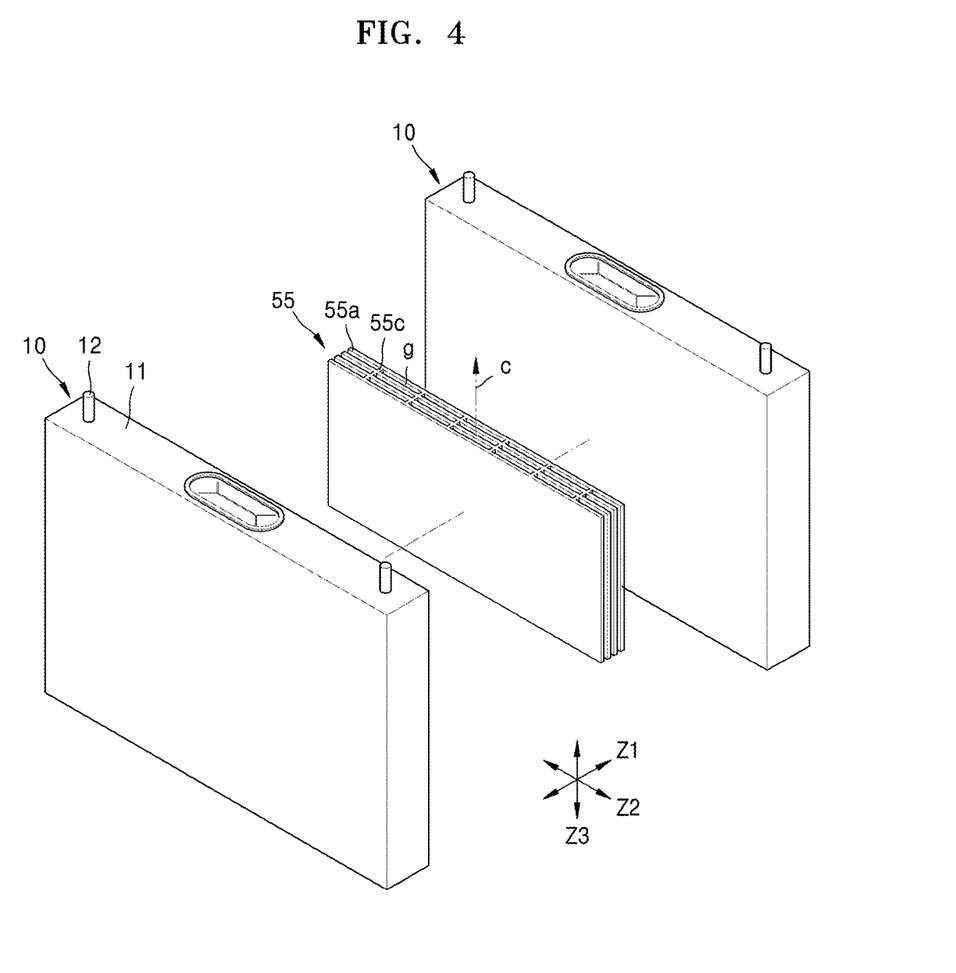
FIG. 4 illustrates an enlarged perspective view of a multi-layer insulation sheet.
Figure 5A:
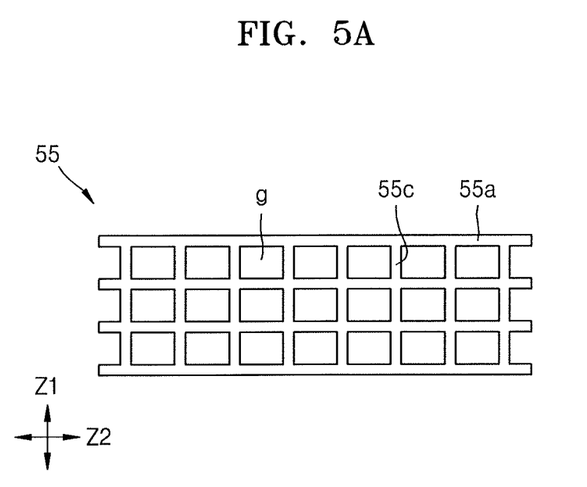
FIGS. 5A and 5B illustrate cross-sectional views of the multi-layer insulation sheet illustrated in FIG. 4.
Figure 5B:
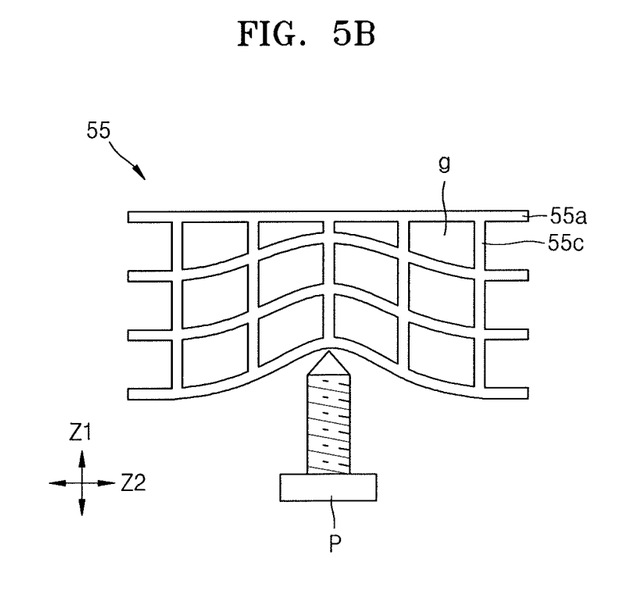

FIG. 4 is an enlarged perspective view illustrating one of the multi-layer insulation sheets 55. FIGS. 5A and 5B are views illustrating a cross-sectional structure of the multi-layer insulation sheets 55.

The multi-layer insulation sheets 55 prevent sparks, fire, and explosion that may occur when the battery cells 10 are penetrated. That is, the multi-layer insulation sheets 55 may improve anti-penetration characteristics of the battery cells 10. For example, each of the multi-layer insulation sheets 55 may include a plurality of insulation layers 55a extending in a direction parallel with major surfaces of the battery cells 10, e.g., in a plane defined by directions Z2 and Z3, so as to block a conductor P (FIG. 5B) from penetrating the surfaces of the battery cells 10 and to insulate the battery cells 10 from the conductor P for preventing sparks that may be generated if a high current momentarily flows between the conductor P and the battery cells 10.

For example, in a penetration test, a sharp conductor P, e.g., a nail, may be pushed into the battery cells 10 to examine whether an electric short circuit is formed between the sharp conductor P and the battery cells 10, and to evaluate the safety of the battery cells 10. For example, the cases 11 of the battery cells 10 may be connected to the electrode terminals 12 and thus may have a polarity. In this case, if a conductor P were to penetrate the battery cells 10, the cases 11 having a polarity and connected to electrode plates having an opposite polarity could result in an internal short circuit. Further, if opposite polarities were to be connected through the conductor P, a high current could momentarily flow to result in fire, explosion, etc.

In contrast, since each of the multi-layer insulation sheets 55 includes the insulation layers 55a covering, e.g., overlapping, surfaces of the battery cells 10, the multi-layer insulation sheets 55 may prevent contact between a potential conductor P and the battery cells 10. Thus, a short circuit between the potential conductor P and the battery cells 10 may be prevented.

The surfaces of the battery cells 10 may be main surfaces of the battery cells 10. For example, the battery cells 10 may have a hexahedral shape, and the main surfaces of the battery cells 10 may be the largest surfaces of the battery cells 10. In the exemplary embodiment, the main surfaces of the battery cells 10 may be front surfaces or rear surfaces of the battery cells 10 in the arrangement direction (i.e., the forward or backward direction Z1) of the battery cells 10. The multi-layer insulation sheets 55 may cover and protect the main surfaces of the battery cells 10 which are the largest surfaces of the battery cells 10, thereby improving the anti-penetration characteristics of the main surfaces of the battery cells 10.

The insulation layers 55a of each of the multi-layer insulation sheets 55 that extend in a direction parallel with surfaces of the battery cells 10 may be connected as a single sheet. As described later, the insulation layers 55a may be connected through a connection pattern 55c to form a single sheet having a net shape. That is, each of the multi-layer insulation sheets 55 may have a single sheet shape in which a plurality of insulation layers 55a are connected with each other through the connection pattern 55c.

In detail, as illustrated in FIG. 4A, each of the multi-layer insulation sheets 55 may be a porous sheet in which voids (g) are formed. The voids (g) of the multi-layer insulation sheets 55 may function as cooling channels (c) in which a cooling medium (e.g., low-temperature ambient air) flows between the battery cells 10. In further detail, each of the multi-layer insulation sheets 55 includes the insulation layers 55a parallel with surfaces of the battery cells 10, and the voids (g) may be formed between the insulation layers 55*a*. Owing to the voids (g), cooling channels (c) may be formed in a direction parallel with the insulation layers 55*a*.

In the exemplary embodiment, the cooling channels (c) may be formed in the upward or downward direction Z3. In more detail, a cooling medium (e.g., air) introduced into the multi-layer insulation sheets 55 from lower sides of the multi-layer insulation sheets 55 may be heated while flowing in the cooling channels (c) and may be discharged from the multi-layer insulation sheets 55 through upper sides of the multi-layer insulation sheets 55 by the effect of buoyancy. That is, the cooling channels (c) of the multi-layer insulation sheets 55 may be formed in the upward or downward direction Z3 parallel with the direction of gravity.

The cooling channels (c) of the multi-layer insulation sheets 55 may be connected to, e.g., aligned with, cooling channels of the spacers 50 surrounding the multi-layer insulation sheets 55. For example, the spacers 50 having a plurality of convex or concave shapes may form cooling channels, and the cooling channels of the spacers 50 and the cooling channels (c) of the multi-layer insulation sheets 55 may be connected to each other to form overall cooling channels that extend between the battery cells 10 in the upward or downward direction Z3.

The voids (g) of the multi-layer insulation sheets 55 may absorb penetration of a conductor P. For example, the voids (g) of the multi-layer insulation sheets 55 may function as spare spaces for receiving a conductor P that penetrates into the battery module 100 while being compressed. That is, since the multi-layer insulation sheets 55 absorb penetration of the conductor P, the battery cells 10 neighboring each other may not be pressed. In other words, even though the conductor P penetrates into the battery module 100, the penetration of the conductor P may be absorbed without physical interference between the conductor and the battery cells 10. In this case, the multi-layer insulation sheets 55 may surround the conductor P and stably insulate the conductor P for preventing electric interference between the conductor P and the battery cells 10.

The voids (g) of the multi-layer insulation sheets 55 may function as spare spaces that absorb compression of the battery cells 10. For example, since the battery cells 10 are repeatedly charged and discharged, the battery cells 10 may undergo swelling, i.e., expansion caused by an increased internal pressure. In this case, expansion of the battery cells 10 may mostly occur in center regions of the battery cells 10. For example, when the battery cells 10 expand, the center regions of the battery cells 10 may swell in a curved shape. In this case, the voids (g) of the multi-layer insulation sheets 55 may provide spare spaces that sufficiently absorb central swelling of the battery cells 10. That is, the voids (g) of the multi-layer insulation sheets 55 may provide spare spaces for absorbing an external pressure and swelling of the battery cells 10. The mechanism whereby the voids (g) of the multi-layer insulation sheets 55 absorb a compressive force between the battery cells 10 is the same as in the cases of compression caused by swelling of the battery cells 10 and compression caused by an external pressure applied to the battery cells 10.

Referring to FIG. 5A, each of the multi-layer insulation sheets 55 may have a net shape formed by the insulation layers 55*a* extending in a direction parallel with surfaces of the battery cells 10 and the connection pattern 55*c* connecting the insulation layers 55*a* as a single piece.

The number of the insulation layers 55*a* may be at least two, and the insulation layers 55*a* may extend in a direction parallel with surfaces of the battery cells 10, e.g., the main surfaces of the battery cells 10. The insulation layers 55*a* may be formed of an electrically insulating material for insulating the battery cells 10 from the conductor P penetrating into the battery module 100. The insulation layers 55*a* may be formed of an electrically insulating, elastic material. For example, the insulation layers 55*a* may be formed of an elastic material so that the insulation layers 55*a* may temporarily receive a conductor P penetrating from outside into the battery module 100 and return to the original shapes thereof after the conductor P is taken away. The expression "the insulation layers 55*a* have elasticity" means that the insulation layers 55*a* maintain the same original shape and substantially the same cooling performance and anti-penetration characteristics before and after a conductor P penetrates the insulation layers 55*a*.

For example, the insulation layers 55*a* may be formed of a silicone material or a polymer resin. As described later, the insulation layers 55*a* of each of the multi-layer insulation sheets 55 may be formed in one piece by using the same material. For example, each of the multi-layer insulation sheets 55 may be formed in one piece by using a silicone material or a polymer resin. However, materials that may be used to form the multi-layer insulation sheets 55 are not limited to the listed materials. That is, the multi-layer insulation sheets 55 may be formed of various materials.

The voids (g) formed between the parallel insulation layers 55*a* may function as cooling channels (c) between the battery cells 10 and may function as spare spaces receiving of a conductor P pushed from outside into the battery module 100.

The connection pattern 55*c* may connect the insulation layers 55*a* as a single sheet. The connection pattern 55*c* may be formed in one piece with the insulation layers 55*a*. The connection pattern 55*c* and the insulation layers 55*a* may be formed of the same material. For example, the connection pattern 55*c* may extend in a direction crossing the insulation layers 55*a* parallel with each other, so as to connect the insulation layers 55*a* as a single sheet. That is, the connection pattern 55*c* may extend between the parallel insulation layers 55*a* in a direction crossing the insulation layers 55*a* so as to connect the insulation layers 55*a* as a single sheet. The connection pattern 55*c* may connect the insulation layers 55*a* in such a manner that the voids (g) are formed between the insulation layers 55*a*, and the voids (g) may function as cooling channels (c) between the battery cells 10 and as spare spaces receiving a conductor P penetrating from outside into the battery module 100. In more detail, between the insulation layers 55*a* neighboring each other, the connection pattern 55*c* may extend in a direction crossing the insulation layers 55*a*.

The connection pattern 55*c* may connect the insulation layers 55*a* so that the multi-layer insulation sheets 55 may have a net shape. In the exemplary embodiment, the connection pattern 55*c* may have a stripe pattern extending and crossing the insulation layers 55*a* in a direction substantially perpendicular to the insulation layers 55*a*. That is, the connection pattern 55*c* may extend and cross the parallel insulation layers 55*a* in a direction perpendicular to the insulation layers 55*a* so as to connect the insulation layers 55*a*. For example, a plurality of insulation layers 55*a* may be stacked to overlap each other, and the connection pattern 55*c* may extend perpendicularly to the plurality of insulation layers 55*a* to interconnect therebetween, e.g., to define a three-dimensional mesh with the voids (g) therethrough.

The connection pattern 55*c* may have any shape as long as the connection pattern 55*c* connects the insulation layers 55*a* and forms voids (g) between the insulation layers 55*a*.

That is, the connection pattern 55c is not limited to the above-described shapes but may have various shapes.

Figure 6:
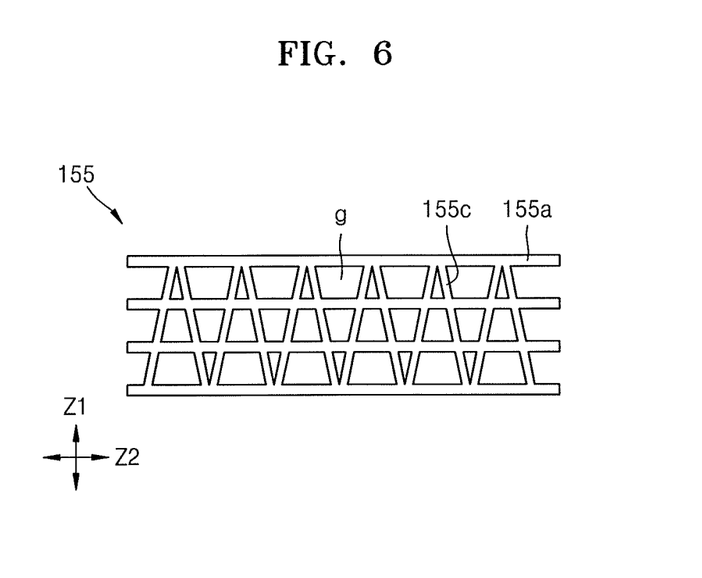
FIGS. 6 and 7 illustrate cross-sectional views of multi-layer insulation sheets according to different exemplary embodiments.
Figure 7:
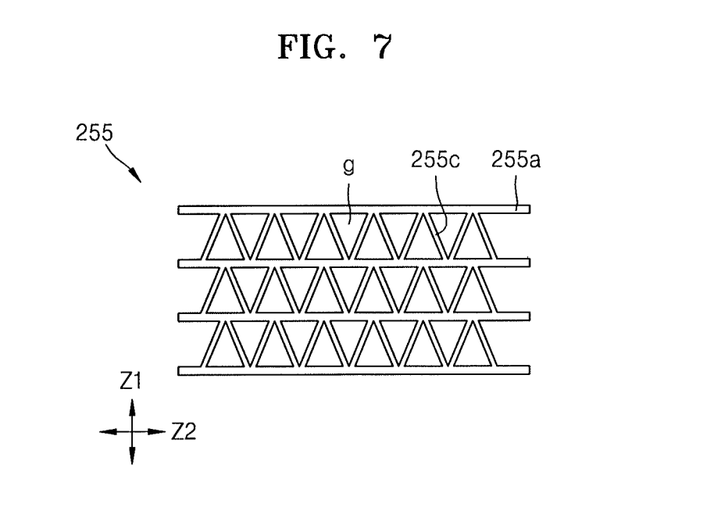

FIGS. 6 and 7 are cross-sectional views illustrating multi-layer insulation sheets 155 and 255 according to different exemplary embodiments.

Referring to FIGS. 6 and 7, the multi-layer insulation sheet 155 includes a plurality of parallel insulation layers 155a, and the multi-layer insulation sheets 255 includes a plurality of parallel insulation layers 255a. A connection pattern 155c is formed between the insulation layers 155a, and a connection pattern 255c is formed between the insulation layers 255a.

Referring to FIG. 6, the connection pattern 155c crosses the insulation layers 155a and connects the insulation layers 155a. For example. the connection pattern 155c may be a zigzag pattern crossing the insulation layers 155a in diagonal directions. In other words, the connection pattern 155c may be a waveform pattern including a plurality of convex or concave shapes that are repeatedly formed. That is, the connection pattern 155c may have a triangular waveform. However. the exemplary embodiment is not limited thereto. For example, the connection pattern 155c may have a rounded water waveform.

Referring to FIG. 7, the connection pattern 255c may be a zigzag pattern formed in diagonal directions between neighboring pairs of the insulation layers 255a for connecting the neighboring pairs of the insulation layers 255a. In other words, the connection pattern 255c may be a waveform pattern including a plurality of convex or concave shapes that are repeatedly formed. In more detail, the connection pattern 255c may have a triangular waveform. However, the exemplary embodiment is not limited thereto. For example, the connection pattern 255c may have a rounded water waveform.

The exemplary embodiments shown in FIGS. 6 and 7 are different in that the connection pattern 155c shown in FIG. 6 has a waveform crossing the insulation layers 155a. The connection pattern 255c shown in FIG. 7 has a waveform extending, e.g., only, between neighboring pairs of the insulation layers 255a.

Figure 8A:
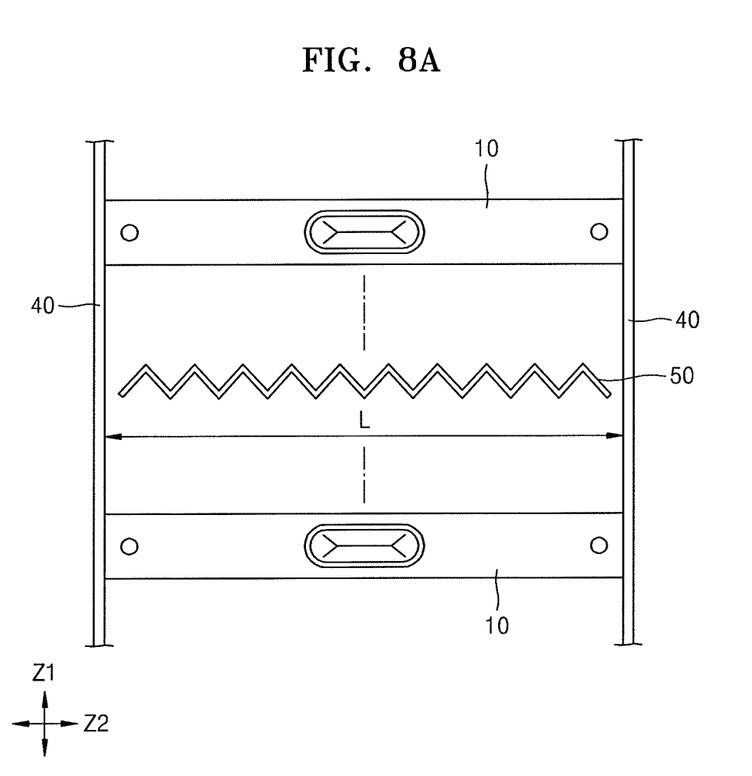
FIGS. 8A and 8B illustrate views of an initially assembled state in which no pressure is applied to a spacer and a compressed state in which pressure is applied to the spacer, respectively.
Figure 8B:
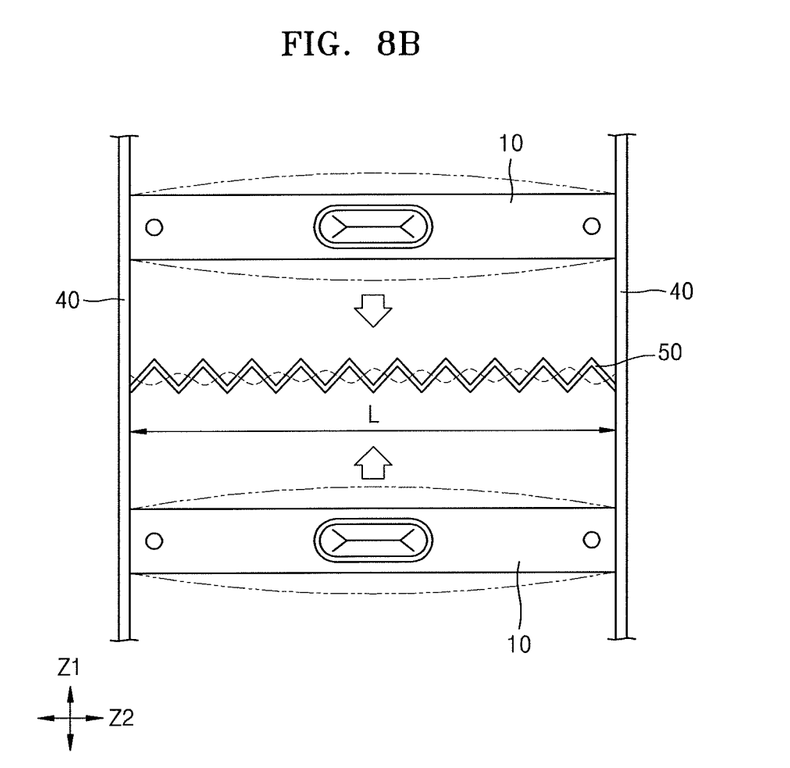

FIGS. 8A and 8B are schematic top views illustrating an initially assembled state in which no pressure is applied to the spacer 50 and a compressed state in which pressure is applied to the spacer 50, respectively. As shown in FIG. 8A, in an initially assembled state of the battery module 100, the battery cells 10 do not swell, and the spacers 50 do not make contact with the side plates 40 disposed at both sides of the spacers 50. That is, in this state, there may be clearance between the spacers 50 and the side plates 40. In other words, the spacers 50 may not be held against the side plates 40.

After a charging or discharging operation starts, the spacers 50 may be elastically deformed. In this case, the spacers 50 are deformed while spreading in the left or right direction Z2 (FIG. 8B).

Referring to FIG. 8B, although the spacers 50 are further pressed, expansion of the spacers 50 in the left or right direction Z2 is suppressed by the side plates 40 disposed at both sides of the spacers 50. In this state, in which the expansion of the spacers 50 is limited to a maximum deformation length L in the left or right direction Z2, the spacers 50 are elastically deformed by pressure applied in the forward or backward direction Zl. Although the spacers 50 are elastically deformed, the deformation of the spacers 50 is limited to the maximum deformation length L in the left or right direction Z2 by the side plates 40 disposed at both sides of the spacers 50. Therefore, the spacers 50 may absorb compressive force acting in the forward or backward direction Z1 while the spacers 50 are deformed in a state in which the lengths of the spacers 50 are not increased in the left or right direction Z2. For example, during the deformation of the spacers 50, the convex shapes of the spacers 50 may be changed from triangular shapes to rounded shapes. Then, after the compressive force is released, the shape of the spacers 50 may return to the original shape thereof.

As described above, the spacers 50 may be deformed substantially in the same manner when the battery cells 10 swell and an external pressure is applied to the battery module 100. For example, when a compressive force is applied to the battery module 100 in the forward or backward direction Z1, the spacers 50 may undergo deformation while spreading in the left or right direction Z2, thereby absorbing the compressive force applied in the forward or backward direction Z1.

As shown in FIG. 1, the spacers 50 (and the multi-layer insulation sheets 55 disposed in the spacers 50) may be disposed on outer surfaces of the outermost battery cells 10 of the battery cells 10 in the arrangement direction (i.e., the forward or backward direction Z1) of the battery cells 10 as well as being disposed between the battery cells 10. That is, the end plates 60 are disposed on both sides of the battery cells 10 in the arrangement direction (i.e., the forward or backward direction Z1) of the battery cells 10, and the spacers 50 may also be disposed between the end plates 60 and the outermost battery cells 10. In this case, a compressive force applied to inner battery cells 10 may be absorbed by spacers 50 disposed on both sides of the inner battery cells 10, and a compressive force applied to the outermost battery cells 10 may also be effectively absorbed by spacers 50 disposed on both sides of the outermost battery cells 10.

In the exemplary embodiment, the spacers 50 are disposed between the battery cells 10, and the multi-layer insulation sheets 55 are disposed in the spacers 50. However, in another exemplary embodiment, spacers 50 may be disposed between a plurality of battery modules 100, and multi-layer insulation sheets 55 may be disposed in the spacers 50. The former exemplary embodiment is provided in consideration of compression between neighboring battery cells 10, and the latter exemplary embodiment is provided in consideration of compression between neighboring battery modules 100. Although the exemplary embodiments are provided for different applications, the technical idea of using spacers 50 and disposing multi-layer insulation sheets 55 in the spacers 50 is substantially the same in the exemplary embodiments.

As described above, according to the one or more of the above exemplary embodiments, the battery module 100 has a sufficient degree of stiffness against an internal or external pressure, thereby effectively absorbing an external pressure or an internal pressure caused by swelling. In addition, the battery module 100 may be stably used even when a conductor is inserted into the battery module 100.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
    battery cells arranged adjacent to each other along a first direction;
    a spacer between neighboring battery cells the spacer having a corrugated structure defined by a plurality of convex/concave shapes repeatedly arranged in a direction perpendicular to the first direction such that the spacer is elastically deformable in the direction perpendicular to the first direction in response to a compressive force in the first direction so as to absorb the compressive force; and
    a multi-layer insulation sheet between the neighboring battery cells together with the spacer, the multi-layer insulation sheet including a plurality of insulation layers in a form of insulation sheets extending in parallel with surfaces of the battery cells, the multi-layer insulation sheet including a connection pattern that spaces the insulation layers apart from each in the first direction to provide a void between the insulation layers,
    wherein the spacer provides a space for air to flow between the battery cells.

2. The battery module as claimed in claim 1, wherein the spacer and the multi-layer insulation sheet are at non-overlapping positions when viewed from a major surface of the spacer, such that the spacer and the multi-layer insulation sheet do not physically interfere with each other.

3. The battery module as claimed in claim 2, wherein the multi-layer insulation sheet is in an opening of the spacer.

4. The battery module as claimed in claim 3, wherein the opening is in a center region of the spacer.

5. The battery module as claimed in claim 3, wherein the opening faces the first direction, the opening being surrounded by the spacer in directions other than the first direction.

6. The battery module as claimed in claim 1, wherein the multi-layer insulation sheet is within an opening of the spacer.

7. The battery module as claimed in claim 6, wherein the plurality of insulation layers of the multi-layer insulation sheet are stacked within the opening of the spacer, the first direction extending along a normal to major surfaces of the plurality of insulation layers.

8. The battery module as claimed in claim 7, wherein the connection pattern interconnects the insulation layers in the first direction to define a three-dimensional mesh structure.

9. The battery module as claimed in claim 1, wherein the connection pattern between the insulation layers connects the insulation layers to define a netlike cross-section.

10. The battery module as claimed in claim 9, wherein the connection pattern extends in directions crossing the insulation layers so as to connect the insulation layers to one another.

11. The battery module as claimed in claim 9, wherein the connection pattern extends between neighboring pairs of the insulation sheets in directions crossing the insulation sheets so as to connect the pairs of the insulation sheets to one another.

* * * * *